(12) United States Patent
Janus et al.

(10) Patent No.: US 6,321,017 B1
(45) Date of Patent: Nov. 20, 2001

(54) PORTAL BEND LIMITER/STRAIN RELIEVER FOR FIBER OPTIC CLOSURE EXIT PORTAL

(75) Inventors: Neal Anthony Janus, Parsippany; Anthony Pellegrino, Gladstone; Randy Alan Reagan, Morris Plains, all of NJ (US); Elwood Horace Green, Jr., Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/399,885

(22) Filed: Sep. 21, 1999

(51) Int. Cl.[7] ..................................................... G02B 6/00
(52) U.S. Cl. ............................................ 385/134; 385/135
(58) Field of Search ..................................... 385/134–137

(56) References Cited

U.S. PATENT DOCUMENTS

| | | | |
|---|---|---|---|
| 5,642,219 | * | 6/1997 | Ogiya et al. ......................... 359/341 |
| 5,937,131 | * | 8/1999 | Haataja et al. ....................... 385/136 |
| 6,044,194 | * | 3/2000 | Meyerhoefer ........................ 385/134 |

* cited by examiner

Primary Examiner—John D. Lee
Assistant Examiner—Sarah N Song
(74) Attorney, Agent, or Firm—Gibbons, Del Deo, Dolan, Griffinger & Vecchione

(57) ABSTRACT

A bend limiter/strain reliever is provided for maintaining optical fiber bend limits at exit portals of a optic fiber closure for the closure's entire range of motion, from being fully closed to being fully open. Bend limits are maintained as optical fiber is directed on paths through a closure exit portal between the closure interior and wire brackets on the closure exterior. Fibers are retained, organized and strain relieved by the bend limiter/strain reliever such that directed fiber is maintain at a minimum bend radius on such fiber paths. The curved surface of the bend limiter/strain reliever allows the closure to be accessed without excessive bending of so routed optical fibers. In this manner, optical signal degradation and/or total loss is avoided by limiting the bending of routed optical fiber to radii in excess of a predetermined minimum bend radius. Horizontal members separate the bend limiter/strain reliever into compartments and make it easy to isolate fibers so that they may be efficiently traced and removed during system maintenance.

7 Claims, 6 Drawing Sheets

PORTAL BEND LIMITER/STRAIN RELIEVER FOR FIBER OPTIC CLOSURE EXIT PORTAL

CROSS REFERENCE TO RELATED APPLICATIONS

This application is related to the following:

U.S. patent application Ser. No. 09/399,869, entitled Optical Fiber Bend Limiter For Optical Fiber Routing System, filed Sep. 21, 1999;

U.S. patent application Ser. No. 091400,597, entitled Fiber Optic Interconnection Closure, filed Sep. 21, 1999;

U.S. patent application Ser. No. 09/401,166 entitled Fiber Optic Interconnection Combination Closure, filed Sep. 21, 1999; and U.S. patent application Ser. No. 09/401,169, entitled Panel/Tray For Fiber Optic Interconnection Closure, September 21, 1999;

All of the above listed patent applications are assigned to Lucent Technologies, the assignee herein. All are herein incorporated into this disclosure by reference.

FIELD OF THE INVENTION

The invention relates generally to fiber optic cable routing systems and more specifically to assemblies for routing optical fiber without violating the minimum bend radius for the fiber.

BACKGROUND OF THE INVENTION

Optical communications refers to the medium and the technology associated with the transmission of information as light pulses. Many applications utilize an optical fiber network to establish optical communications between network locations. In order to enable optical communication and the flow of optical signals between network locations, various interconnections must be established between different optical fibers.

Optical fiber cable consists of a plurality of optical fibers surrounded by protective sheath. Each individual optical fiber ("fiber") consists of a small diameter core of low-loss material such as glass or plastic surrounded by a protective cladding that has a slightly lower index of refraction than the core. Light, as it passes from a medium of higher index of refraction to one of lower index of refraction, is bent away from the normal to the interface between the two media. At a critical angle of incidence, transmitted light is totally reflected within the medium having the higher index of refraction. Building on these basic rules of physics, optical fibers are designed and made such that there is essentially total reflection of light as it propagates through an optical fiber core. Thus, the core is able to guide light pulses with small attenuation of transmitted light pulses and low signal loss.

In many cases of signal transmission via optical media, a key transmission parameter is signal loss per distance transmitted. Due to the fragile nature of the core of an optical fiber, there is a need to protect an optical fiber from external sources of stress, such as bending, pressure and strain, that can damage the fiber and may also increase signal loss. For example, an optical fiber should not be bent sharply anywhere along its path. In addition to the possibility of breakage or fracture, if an optical fiber is bent past a critical angle, portions of transmitted light pulses will not be reflected within the core of the optical fiber and will no longer traverse the optical fiber. These attenuated portions of light pulses result in signal loss and thus, degradation of signal quality.

Referring to FIG. 1a, there is shown a simple ray model of light pulse transmission on a straight optical fiber. The optical fiber 100, shown in longitudinal cross section, has an optical core 102 which is surrounded by a cladding 104 and has a critical angle $\theta_c$. FIG. 1b shows a simple ray model of light pulse transmission in a bent optical fiber. As illustrated, when the bend of the optical fiber 100 is such as to cause a light ray to strike the boundary of the core 102 and cladding 104 at an angle greater than the critical angle $\theta_c$—the angular excess, as shown in the inset, being labeled $\theta_{bend}$—the light ray leaks out of the optical fiber core. Further, while lower order mode light rays are not likely to leak out of the optical fiber core, they may be transformed into higher order mode light rays and may leak out at a subsequent bend in the optical fiber. Accordingly, it is necessary that an optical fiber be routed so that bends in the optical fiber be of a sufficient radius to substantially avoid occurrence of such an extra critical angle, and the associated light leakage.

The minimum bend radius characterizes the radius below which an optical fiber should not be bent to avoid light ray leakage. Typically, the minimum bend radius varies with fiber design. Bending an optical fiber with a radius smaller than the minimum bend radius may result in increased signal attenuation and/or a broken optical fiber.

Ordinarily, a unique optical fiber routing will be required to transmit light pulses between network locations. Over this unique route, light pulses may be propagated across several different optical fibers. At each transition from one fiber to another, individual optical fibers may be joined together, thereby enabling light pulses to be carried from/between a first fiber and a second fiber. Once made, a connection must be held securely in place to prevent a loss of transmission quality. Transmission via optical fiber also requires repeating (i.e., amplifying) the transmitted optical signal at distance intervals. Consequently, optical fiber connections also must be made at the distance intervals where such signal repeater equipment is needed.

It may be necessary to bend optical fibers around corners and other obstacles in order to route the optical fiber to/from optical fiber network equipment and accomplish the required connections. While performing such activity, stresses on the optical fiber must be limited. Moreover, connections of optical fibers need to be isolated and protected from environmental degradation, strain, and torque in order to maintain the proper alignment between connected optical fibers and to avoid undesirable signal attenuation.

Previously, closures have been designed to protect connections of copper wire. A closure typically houses a cable interconnect frame and provides mounting surfaces for electronics and apertures for cabling to pass to/from the enclosed chamber of the closure. An articulated door is usually provided for access to the enclosed interconnect frame and electronics compartment. However, optical fiber closures present a host of different complexities revolving around bend limiting and the minimum bend radius as described above.

Existing closure architecture does not always integrate installed optical fibers well with regard to the maintenance of the minimum bend radius for the fibers. Further, such closures provide no or limited means to control, organize, or stow optical fibers and fiber slack routed in the interior or along the exterior of the closure. For instance, provisions are not made for maintaining the minimum bend radius of fibers entering/exiting a closure resulting in fibers being jostled while accessing the closure. Consequently, special care is required in order to access (i.e., open and close) the closure without exceeding fiber bend limits or breaking optical fibers, which action could cause a system malfunction. Thus, a technician faces many logistical problems during maintenance of optical fibers within such a closure, adding significant complexity and time to that required to remove, repair and/or replace fibers in a closure.

SUMMARY OF THE INVENTION

Accordingly, it is an objective of the invention to provide a bend limiter/strain reliever for managing and protecting optical fibers at an exit portal of a closure in an optical fiber network. It is an additional objective of the invention to prevent excessive fiber bending and to provide fiber strain relief at a closure exit portal. It is also an objective of the invention to provide a bend limiter/strain reliever that maintains optical fiber bend limits for fibers routed therethrough for all possible angular opening positions allowed during access to a closure interior. It is a further objective of the invention to compartmentalize fibers routed through the bend limiter/strain reliever to prevent fibers from piling-up in a single area and thereby avoid problematic fiber removal during system maintenance. As a still further objective, the bend limiter/strain reliever should also enable efficient system maintenance by providing easy access to routed optical fibers.

To that end, a bend limiter/strain reliever is described that maintains bend limits for optical fibers at an exit portal of a closure. The bend limiter/strain reliever of the invention maintains bend limits as fibers are transitioned from the closure interior to a vertical raceway along the closure exterior. Once outside a closure, optical fibers may be routed for interconnection at other optical network equipment via a fiber routing system. Since the interior chamber of a closure must be accessed in order to route fiber and fashion fiber connections, the bend limiter/strain reliever maintains bend limits over a closure's entire range of motion, from a fully closed position to a fully opened position. Thus, full access to the closure interior is provided, enabling quick and convenient fiber installation and service.

A bend limiter/strain reliever defines a surface with a radius of curvature greater than a predetermined minimum bend radius. The bend limiter/strain reliever gathers, organizes and strain-relieves optical fibers transitioned across its surface. Horizontal members join smaller sub-surfaces to form the curved surface of the bend limiter/strain reliever. Horizontal members also divide the surface into compartments in which optical fibers may be separated so that the fibers remain easy to trace and remove from the bend limiter/strain reliever. Fibers are held in place on the bend limiter/strain reliever by vertical retaining strips with fiber access slots that allow push-through wiring access. Peg members hold the bend limiter/strain reliever in place in the closure. Optical fibers are routed across the curved surface of the bend limiter/strain reliever to ensure that routed fibers are maintained at bend radii greater than their inherent minimum bend radius, thereby limiting stress on the fibers as well as avoiding light leakage due to excessive bend angles and fiber stress.

BRIEF DESCRIPTION OF THE DRAWINGS

For a better understanding of the present invention, reference is made to the following description of an exemplary embodiment thereof, considered in conjunction with the accompanying drawings, in which.

In the detailed description below, like reference numerals are used to describe the same, similar or corresponding elements in FIGS. 1–5.

DETAILED DESCRIPTION OF THE DRAWINGS

There is described herein, illustrative and descriptive forms and embodiments of a closure bend limiter/strain reliever according to the invention. As would be apparent to those skilled in the art, various changes using different configurations and functionally equivalent components may be made without departing from the scope of the invention. Thus, the invention is not considered limited to the particular illustrative embodiments shown in the specification and all such alternate embodiments are intended to be included in the scope of this invention.

Fiber Administration

Figure 1A:
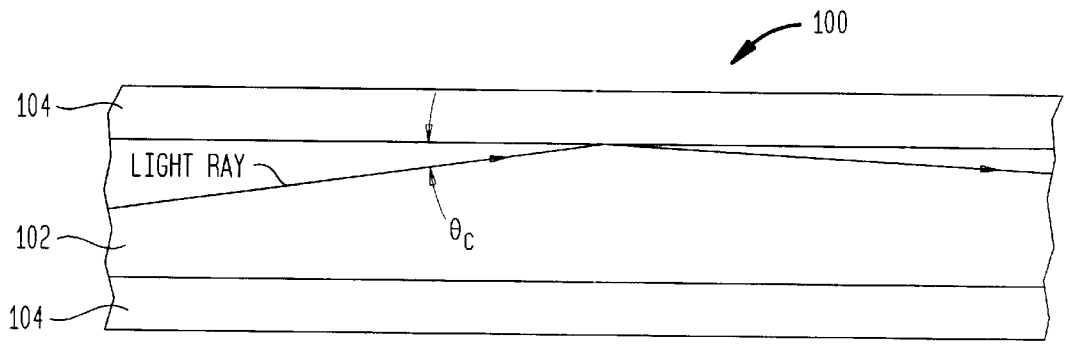
FIG. 1a is a simple ray model of light pulse transmission for a straight optical fiber.
Figure 1B:
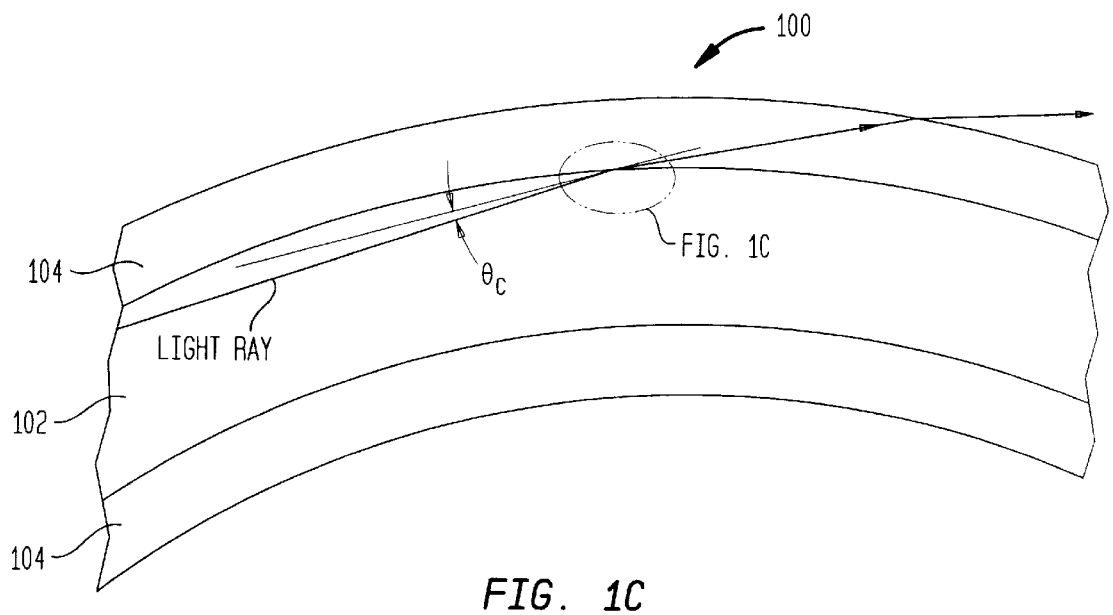
FIG. 1b and 1c is a simple ray model of light pulse transmission for a bent optical fiber.
Figure 1C:
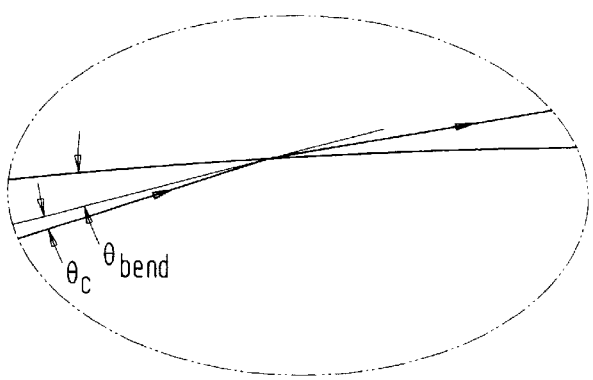
Figure 2:
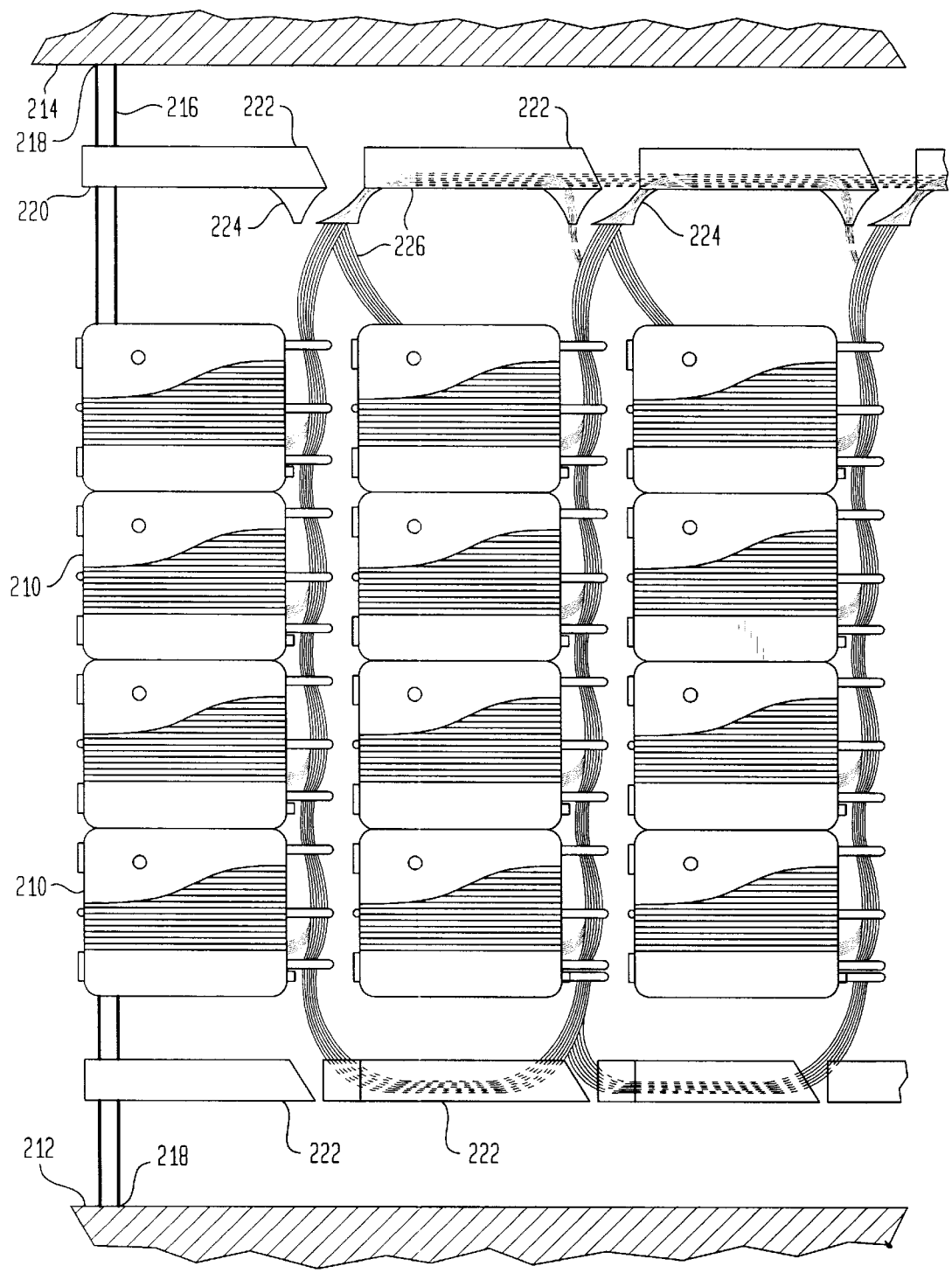
FIG. 2 depicts an exemplary optical fiber closure arrangement in an optical fiber network.

An exemplary arrangement of fiber optic closures in an optical fiber network is shown in FIG. 2. Fiber optic closures 210 are affixed in vertical columns on a wall between a floor 212 and a ceiling 214. Optical fiber cables 216 pass through holes 218 in the floor 212 or the ceiling 214 of a room, pass through an aperture 220 in a trough system 222 and are directed into closures 210. Optical fiber cables 216 containing optical fibers that are to be connected in a particular closure 210 in the depicted room are broken out of the cable's protective sheath in the closure and directed within the closure for interconnection. An optical fiber routing system of troughs 222 and bend limiters 224 lead selected optical fibers 226 between closures for interconnection of optical network equipment while maintaining fiber bend limits at radii in excess of a minimum bend radius. Troughs 222 deployed without bend limiters may also be positioned below the closures 210 to gather fibers directed between the closures. Thus, optical fibers are protected against excessive stress throughout their path between individual closures. Such an optical fiber routing system is described in detail in cross-referenced related application U.S. Ser. No. 091399, 869, entitled "Optical Fiber Bend Limiter For Optical Fiber Routing System."

Fiber Optic Interconnection Combination Closure

Figure 3:
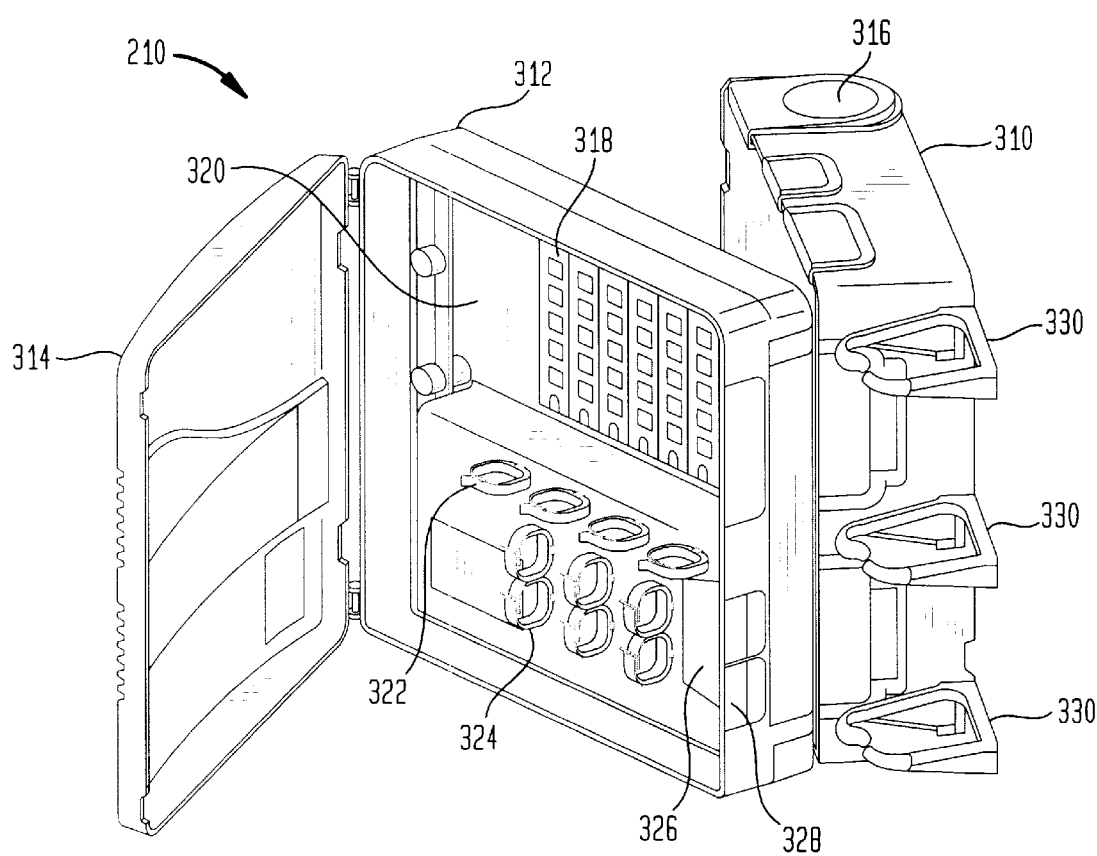
FIG. 3 depicts a fiber optic interconnection combination closure in which the closure bend limiter/strain reliever of the invention may be deployed.

A fiber optic interconnection combination closure is depicted in FIG. 3. A closure provides an enclosed chamber into which optical fiber cables and optical fibers pass for the fashioning of optical fiber connections. The depicted combination closure provides an enclosure in which optical fibers may be spliced and terminated while being routed and stored in compliance with fiber bend limits. The modular design of a closure allows any number of closures to be easily added to a closure arrangement in an optical fiber network.

A combination closure 210 is comprised of three articulated segments—a base assembly 310, a chassis 312, and a cover plate 314, which couple to provided an enclosed chamber. The hinge mechanism of the closure permits the base assembly—chassis and the chassis—cover plate to open from each other in excess of 100° for access to the closure's interior chamber. The base assembly 310 has coaxially aligned apertures 316 with entry port grommets that may be sized to form graduated openings for optical fiber cables (not shown). Individual optical fibers may be broken out of optical fiber cable inside a closure and routed to inter-connection modules via facilities that maintain the routed fibers' minimum bend radius. In the closure chamber, fibers are interconnected via various methods well known to those skilled in the art of the invention. In the base assembly 310, optical fibers are routed in observance of their bend limit to splice organizers (not shown) for the fashioning of fiber splices. In the chassis 312, optical fibers are routed in observance of their bend limit to termination adapters 318 mounted on a two-plane panel 320 for the fashioning of fiber terminations. (Hereinafter, the maintenance of routed fiber in compliance with bend limits is sometimes referred to as "fiber control" or "the controlling of fiber".)

Fiber rings 322, fiber retainers 324 and a gradual taper 326 on the chassis panel 320 organize and assist in the maintenance of the minimum bend radius for fibers routed between termination adapters 318 and exit portals 328. From exit portals 328, optical fibers are transitioned into wire brackets 330 attached to the exterior of base assembly 310. Wire brackets 330 form a vertical raceway through which optical fibers directed to other closures and/or optical system equipment may be routed. Such a fiber optic closure in which optical fibers may be routed and fiber connections fashioned while fiber stress is minimized is described in detail in cross-referenced related applications, U.S. patent application Ser. No. 09/400,597, entitled Fiber Optic Interconnection Closure.

Bend Limiter/Strain Reliever

Figure 4A:
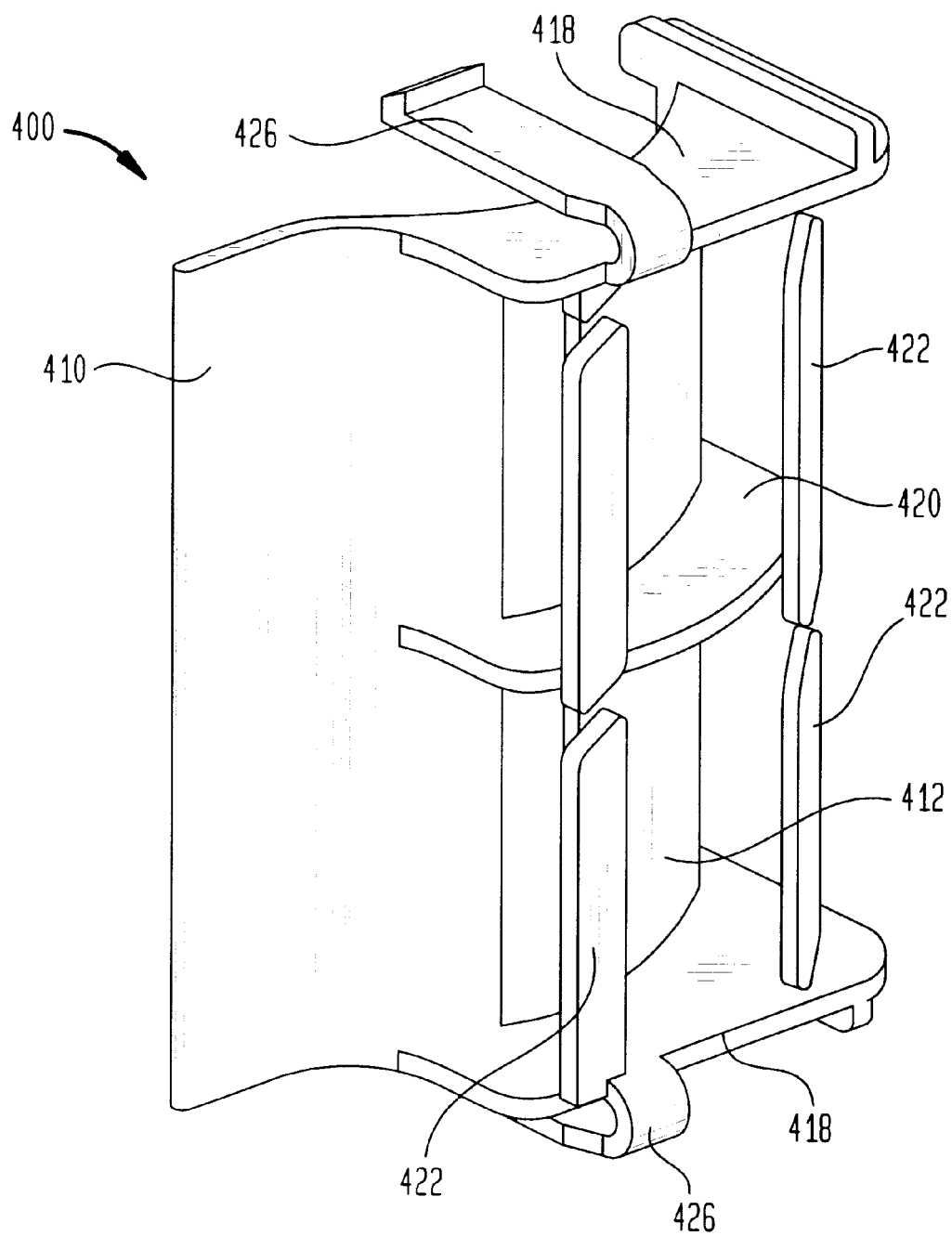
FIG. 4a depicts a closure bend limiter/strain reliever in accordance with the invention.
Figure 4B:
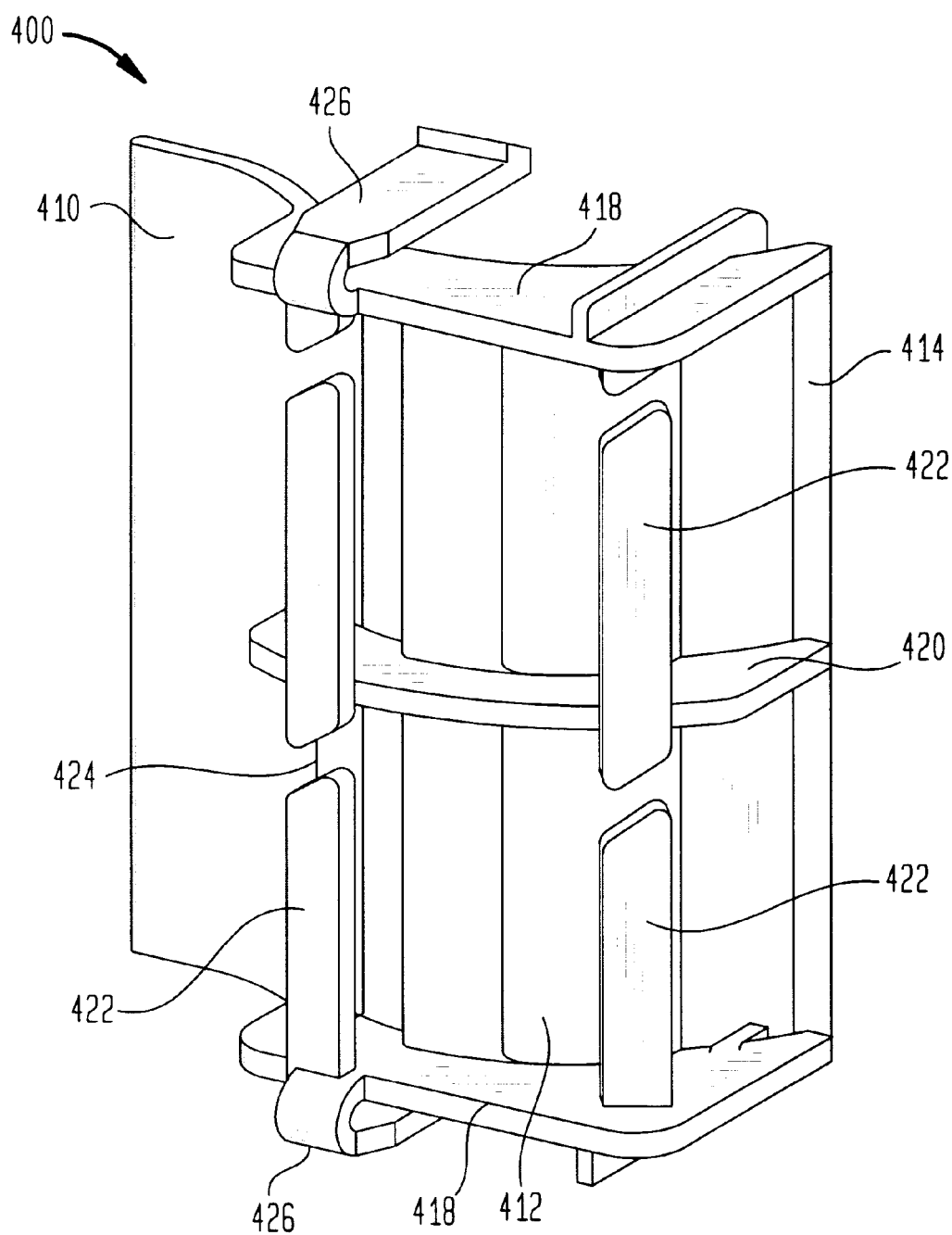
FIG. 4b depicts an alternative view of a closure bend limiter/strain reliever in accordance with the invention.

Optical fibers and fiber connections routed in a closure are protected from signal degradation caused by excessive fiber stress and/or detrimental environmental conditions. However, a discontinuity arises at the exit portals of a closure, where optical fibers are transitioned from the closure interior into the raceway along the closure exterior for routing to other optical network equipment. At an exit portal, in order to change fiber direction, the fibers must be bent. Furthermore, fibers may be sharply bent in excess of the minimum bend radius at this point, since the chassis and base assembly are articularly connected and may be opened from each other with a range of motion in excess of 100°. Therefore, a bend limiter/strain reliever having a curved surface over which optical fibers are routed is deployed at this position to ensure that the fibers are not bent at radii in excess of the minimum bend radius. FIG. 4a and 4b depict alternative views of an illustrative embodiment of a bend limiter/strain reliever for a fiber optic closure exit portal in accordance with the invention.

As illustrated, a bend limiter/strain reliever 400 has sub-surfaces that are joined to define a surface with a radius of curvature greater than a predetermined minimum bend radius—that minimum bend radius being selected to be equal to or greater than the critical bend radius of fibers to be routed therethrough. A first curved surface 410, a second curved surface 412 and a third curved surface 414 join to form what can be described as the general outline of the curved outer surface of one-half of a cylinder. Optical fibers are directed over the surface formed by the curved sub-surfaces in order to maintain bend limits at the exit portals of a closure. Typically, the minimum bend radius is a variable in fiber design and so, the curvature of a bend limiter/strain reliever may be modified for use with various optical fibers.

The curved sub-surfaces 410–414 are attached to a first end of horizontal members 418–420. In the exemplary embodiment, two exterior horizontal members 418 and an interior horizontal member 420 join the curved sub-surfaces 410–414 of the bend limiter/strain reliever. The horizontal members unite the curved sub-surfaces of the bend limiter/strain reliever together into a single rigid unit. The horizontal members also serve to compartmentalize the bend limiter/strain reliever into channels, enabling optical fibers to be separated so that all the routed fibers do not pile up in a single area of the bend limiter/strain reliever. If all the routed optical fibers were too pile up in single area, it may be problematic to trace and remove fibers from the bend limiter/strain reliever.

Vertical retaining strips 422 are attached to a second end of the horizontal members 418–420, opposite the first end of the horizontal members, which is attached to the curved surfaces of the bend limiter/strain reliever. The width of the horizontal members 418–420 acts to offset the vertical retaining strips 422 from the curved sub-surfaces 410–414, providing depth to the channels in which optical fibers are routed in the bend limiter/strain reliever. The vertical retaining strips 422 retain optical fibers in place in the channels of the bend limiter/strain reliever as the fibers are moved during access to the closure (i.e., opening and closing of the closure chassis from the closure base assembly). The vertical retaining strips 422 are provided with fiber access slot 424 to allow for push-through wiring access, eliminating the need to feed optical fibers through an aperture in the bend limiter/strain reliever. Naturally, the fiber access slots 424 of the bend limiter/strain reliever should be at least as wide as an individual optical fiber to facilitate fiber entry/removal. In an exemplary embodiment, the fiber access slot runs diagonally across the vertical retaining strips. Because optical fibers are draped over the curved surfaces 410–414 of the bend limiter/strain reliever in a linear fashion, the diagonal fiber access slots 424 make it virtually impossible for fibers to become dislodged from the bend limiter/strain reliever; at some point, linearly draped fibers will catch a vertical retaining strip of the bend limiter/strain reliever, thereby being prevented from escaping the interior of the bend limiter/strain reliever absent user intervention.

Peg members 426 attached to the outer surface of the exterior horizontal members 418 are arranged so that the bend limiter/strain reliever may snap into mounting holes (not shown) provided in the two-plane plane (not shown) and the closure chassis (not shown). In a preferred embodiment, the bend limiter/strain reliever slides into an exit portal and snaps into position. Various alternative means of securing the bend limiter/strain reliever to the closure will be apparent to those skilled in the art of the invention. For instance, the bend limiter/strain reliever may slide into a grooved channel of the closure or be bonded to a surface near the closure exit portals.

The bend limiter/strain reliever thus ensures that fiber bend limits for fibers routed therethrough are maintained at closure exit portals. The bend limiter/strain reliever prevents fibers from snagging or bending in excess of the bend limit when the closure interior is accessed, as well as directing fibers from the chassis through the exit portals to the wire brackets. Thus, the bend limiter/strain reliever allows the closure to be accessed for maintenance without undue bending of fibers, which could result in a system malfunction. In an exemplary embodiment, the bend limiter/strain reliever is plastic and formed by injection molding. However, the bend limiter/strain reliever is susceptible to various alternative embodiments of other materials and by other methods as are know to one skilled in the art of the invention.

Bend Limiter/Strain Reliever Deployed at Fiber Optic Closure Exit Portal

Figure 5:
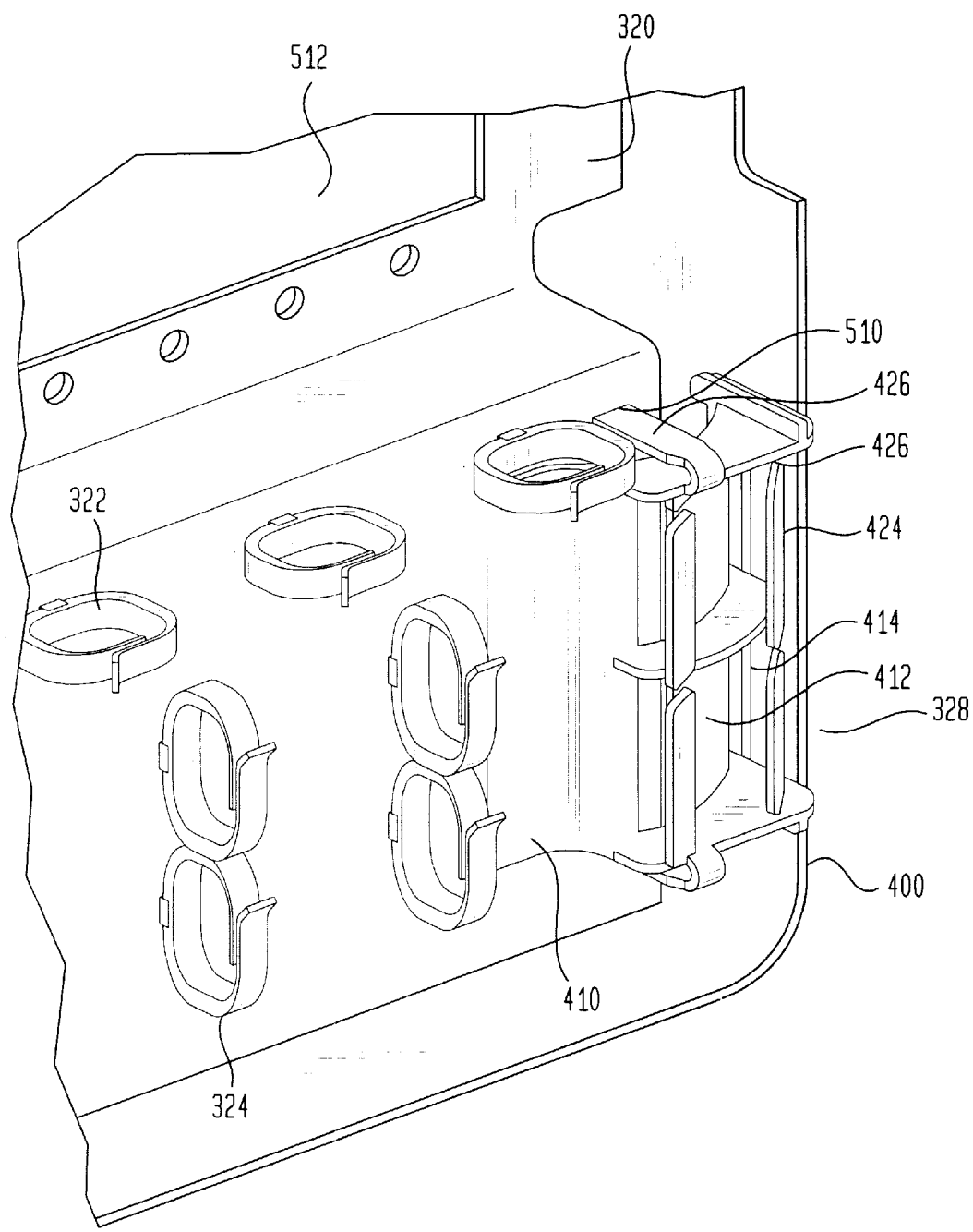
FIG. 5 depicts a closure bend limiter/strain reliever in accordance with the invention deployed in an exit portal of a fiber optic interconnection combination closure.

FIG. 5 depicts a bend limiter/strain reliever 400 in accordance with the invention deployed in an exit portal 328 of a fiber optic interconnection combination closure. The bend limiter/strain reliever is sized to the closure exit portals and snaps into position in the closure with peg members 426 mounting into mounting holes 510 on the two-plane panel 320 and the closure chassis 312. The bend limiter/strain reliever is deployed at the closure exit portal where optical fiber changes direction as it is directed to wire brackets (not shown) on the closure exterior. The bend limiter/strain reliever routes the optical fiber in an approximately 90° turn so that the fiber is directed toward the fiber bracket for routing to other optical network equipment. The 90° turn also provides a degree of strain relief.

Optical fibers (not shown) are directed in the closure from termination adapters (not shown) that are mounted in the primary open area 512 of the two-plane panel 320 to fiber rings 322 and fiber retainers 324 which direct fiber toward the exit portals 328 of the closure. While being directed across the two-plane panel 320, optical fibers encounter the surface of the first curved surface 410 of the bend limiter/strain reliever 400. From this position, the optical fibers are directed across the curved surfaces 410–414 of the bend limiter/strain reliever and out the closure exit portals. Optical fibers are passed into compartments in the bend limiter/strain reliever through diagonal fiber access slots 424 in vertical retaining strips 422. In this manner, the bend limiter/strain reliever maintains fiber bend radii in excess of a minimum bend radius for all closure opening angles. This accommodation permits optical fibers routed from a closure to other network equipment to remain intact and connected within a closure during system maintenance access without excessively bending fibers and causing a system malfunction.

Conclusion

There has been described and illustrated herein, a bend limiter/strain reliever that maintains bend limits for optical fiber at exit portals of a fiber optic closure. Optical fibers routed therethrough in exiting a closure are protected from excessive bending during all possible angular openings of the chassis from the base assembly. The bend limiter/strain reliever organizes, strain relieves and collects optical fibers routed therethrough. Optical fibers are compartmentalized so that individual fibers are easy to trace and remove during system maintenance. The bend limiter/strain reliever of the invention protects optical fibers from excessive bending thus avoiding optical signal degradation and/or total signal loss on fibers routed in an optical fiber network.

It is to be understood that the invention is not limited to the illustrated and described forms and embodiments contained herein. It will be apparent to those skilled in the art that various changes using different configurations and functionally equivalent components may be made without departing from the scope of the invention. Thus, the invention is not considered limited to what is shown in the drawings and described in the specification and all such alternate embodiments are intended to be included in the scope of this invention as set forth in the following claims.

What is claimed is:

1. A device for routing optical fibers in compliance with a predetermined minimum bend radius, said device comprising:

a plurality of arcuate surfaces, said surfaces being joined together to form a partial cylindrical curved surface having a generally vertical longitudinal axis, said curved surface having a radius of curvature greater than a predetermined minimum bend radius, a horizontal member extending radially outwardly from said longitudinal axis and in a plane generally transverse to said longitudinal axis, said horizontal member separating said plurality of arcuate surfaces into compartments.

2. The device for routing optical fibers of claim 1 further comprising a vertical retaining strip attached to said horizontal member for retaining said optical fibers in place in said device.

3. The device for routing optical fibers of claim 2 wherein said vertical retaining strip further includes:

a push-through access means operative to accept push-through placement of said optical fibers routed via said means.

4. The device for routing optical fibers of claim 2 wherein said vertical retaining strip further includes:

a fiber access slot.

5. The device for routing optical fibers of claim 2 further comprising a peg attached to said horizontal member for connecting said device in a fiber optic closure, said peg mountable in a fiber mounting hole in said closure.

6. A device for directing optical fiber through an exit portal of a closure from the interior of said closure to a raceway to the exterior of said closure while maintaining fiber bend limits, said device comprising:

a surface comprising a plurality of sub-surfaces, said sub-surfaces being combined to form a partial cylindrical curved surface having a generally vertical longitudinal axis, said curved surface having a radius of curvature greater than a predetermined minimum bend radius;

a horizontal member extending radially outward from said longitudinal axis and in a plane generally transverse to said longitudinal axis;

a retaining strip, said retaining strip perpendicular to said horizontal member and having an access slot for said optical fiber;

a peg member located at a first mounting position on said horizontal member.

7. A bend limiter for routing optical fiber through an exit portal of a fiber optic closure, said bend limiter maintaining fiber bend limits as optical fiber directed in a first direction is redirected in a second direction substantially perpendicular to said first direction, the bend limiter comprising:

a plurality of sub-surfaces, said sub-surfaces being combined to form a partial cylindrical curved surface having a generally vertical longitudinal axis, said curved surface having a radius of curvature greater than a predetermined minimum bend radius, said curved surface providing a path for said optical fiber between said first direction and said second direction;

a plurality of horizontal members, each horizontal member extending radially outward from said longitudinal axis and in a plane generally transverse to said longitudinal axis, each said horizontal member having a first end and a second end, said first end connected to said curved surface;

a retaining strip, said retaining strip perpendicular to said horizontal members and connected to said second end of each of said horizontal members, said retaining strip having an access slot for said optical fiber;

a plurality of peg members, each said peg member attached to a mounting position on an outer surface of said horizontal member.

* * * * *